(12) United States Patent
Fong (10) Patent No.: US 6,511,087 B1
(45) Date of Patent: Jan. 28, 2003

(54) JOGGING KICK SCOOTER

(76) Inventor: Chin-Long Fong, 3/F., No. 2, Alley 2, Lane 211, Yungfu St., Sanchung City, Taipei County (TW)

(*) Notice: Subject to any disclaimer, the term of this patent is extended or adjusted under 35 U.S.C. 154(b) by 0 days.

(21) Appl. No.: 09/922,155

(22) Filed: Aug. 6, 2001

(51) Int. Cl.[7] .................................................. B62M 1/00
(52) U.S. Cl. ...................................... 280/228; 280/282
(58) Field of Search ................................. 280/200, 210, 280/220, 221, 228, 282

(56) References Cited

U.S. PATENT DOCUMENTS

| | | | | |
|---|---|---|---|---|
| 1,353,011 A | * | 9/1920 | Young | 280/228 |
| 1,696,927 A | * | 1/1929 | Snyder | 280/222 |
| 3,332,704 A | * | 7/1967 | McVicker | 192/64 |
| 4,334,695 A | * | 6/1982 | Ashby | 280/228 |

* cited by examiner

*Primary Examiner*—Kevin Hurley
(74) *Attorney, Agent, or Firm*—Rosenberg, Klein & Lee (57) ABSTRACT

A jogging kick scooter is constructed to include a rectangular open base frame, a track assembly formed of rolls and an endless belt and mounted in the open base frame, a steering control handlebar mounted in the front side of the open base frame to hold and control steering of a front wheel, two rear wheels bilaterally coupled to the open base frame at a rear side, and transmission gear sets respectively connected between the rear wheels and the wheel axle of the last roll of the track assembly and adapted to rotate the rear wheels when the user walks or runs on the track assembly.

10 Claims, 7 Drawing Sheets

JOGGING KICK SCOOTER

BACKGROUND OF THE INVENTION

The present invention relates to kick scooters, and more particularly, to a jogging kick scooter, which has a track assembly for jogging exercise.

A variety of kick scooters have been disclosed, and have appeared on the market. When riding, the rider kicks one leg against the ground to move the kick scooter forwards. Because kick scooter riders tend to kick the same leg during riding, riding a kick scooter cannot balance the exercising amount of the legs.

SUMMARY OF THE INVENTION

The present invention has been accomplished to provide a kick scooter, which eliminates the aforesaid problem. It is the main object of the present invention to provide a jogging kick scooter, which moves when the rider walks or runs on the kick scooter. According to one aspect of the present invention, the jogging kick scooter comprises a rectangular open base frame, a track assembly formed of rolls and an endless belt and mounted in the open base frame, a steering control handlebar mounted in the front side of the open base frame to hold and control steering of a front wheel, two rear wheels bilaterally coupled to the open base frame at a rear side, and transmission gear sets respectively connected between the rear wheels and the wheel axle of the last roll of the track assembly and adapted to rotate the rear wheels when the user walks or runs on the track assembly. According to another aspect of the present invention, the rectangular open base frame has front eyelet lugs and rear eyelet lugs for enabling two jogging kick scooters to be connected into a tandem jogging kick scoter by lock pins.

DETAILED DESCRIPTION OF THE PREFERRED EMBODIMENT

Figure 1:
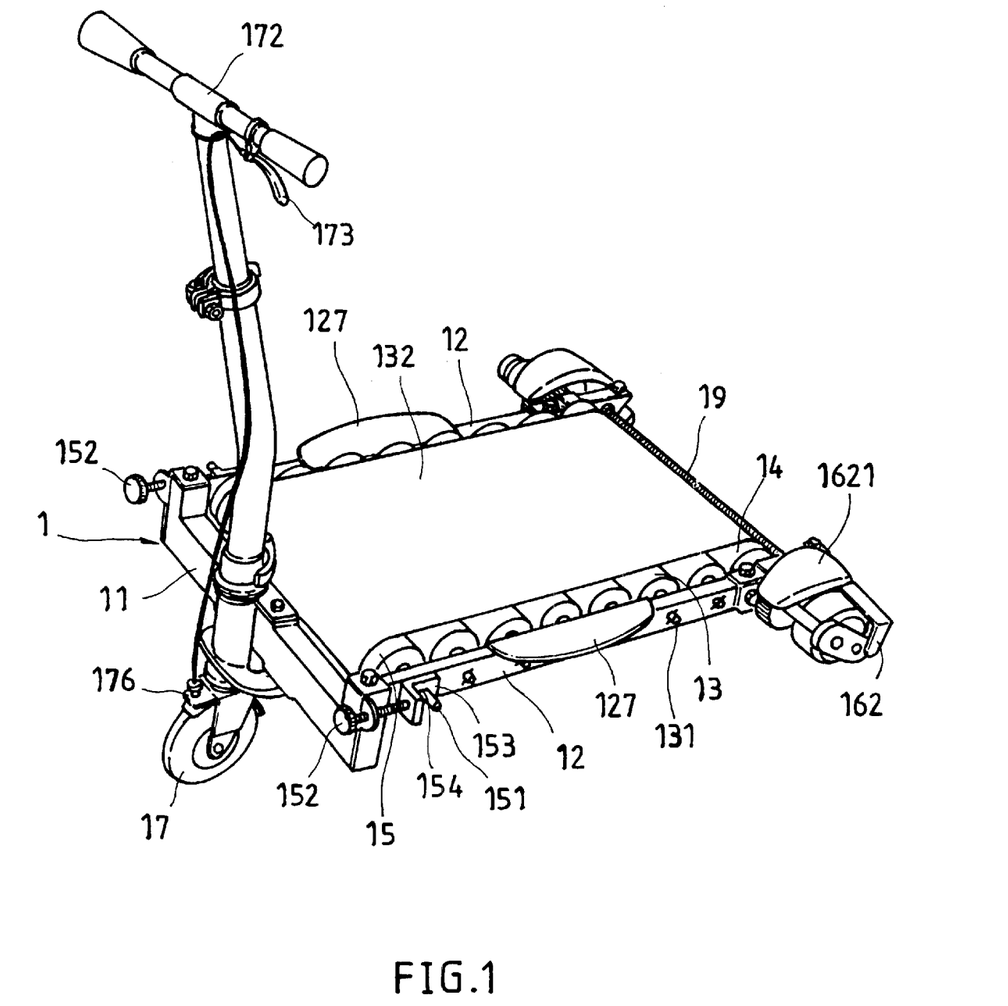
FIG. 1 is an elevational view of a jogging kick scooter according to the present invention.
Figure 2:
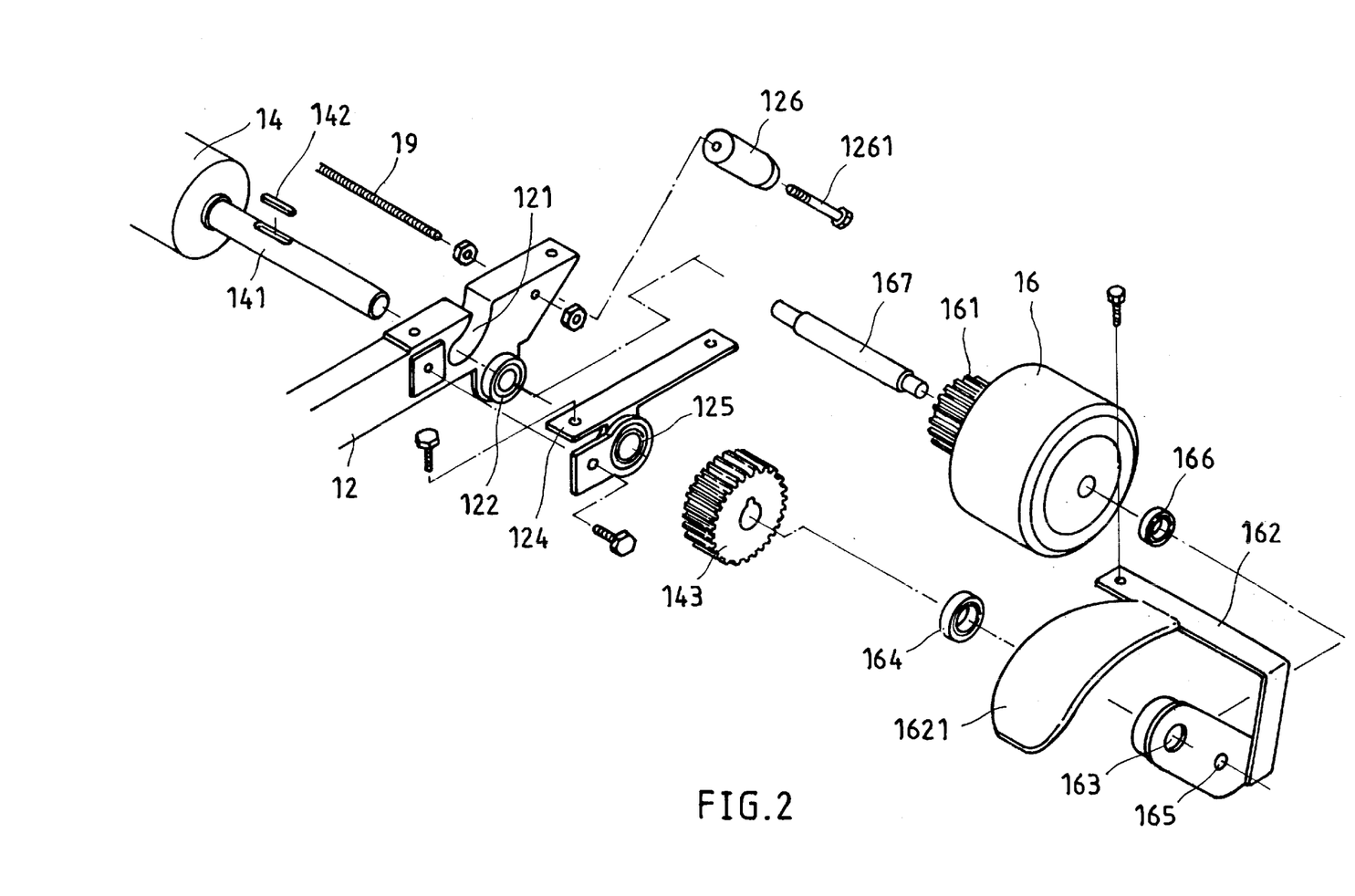
FIG. 2 is an exploded view of a part of the present invention, showing the arrangement of the rear wheel transmission mechanism of the jogging kick scooter.
Figure 3:
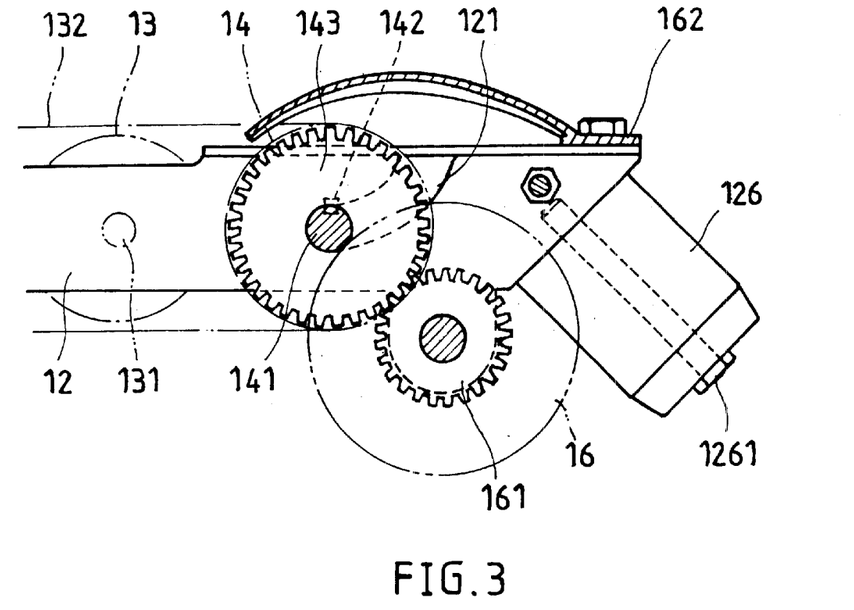
FIG. 3 is a sectional assembly view of the rear wheel transmission mechanism of the jogging kick scooter according to the present invention.
Figure 4:
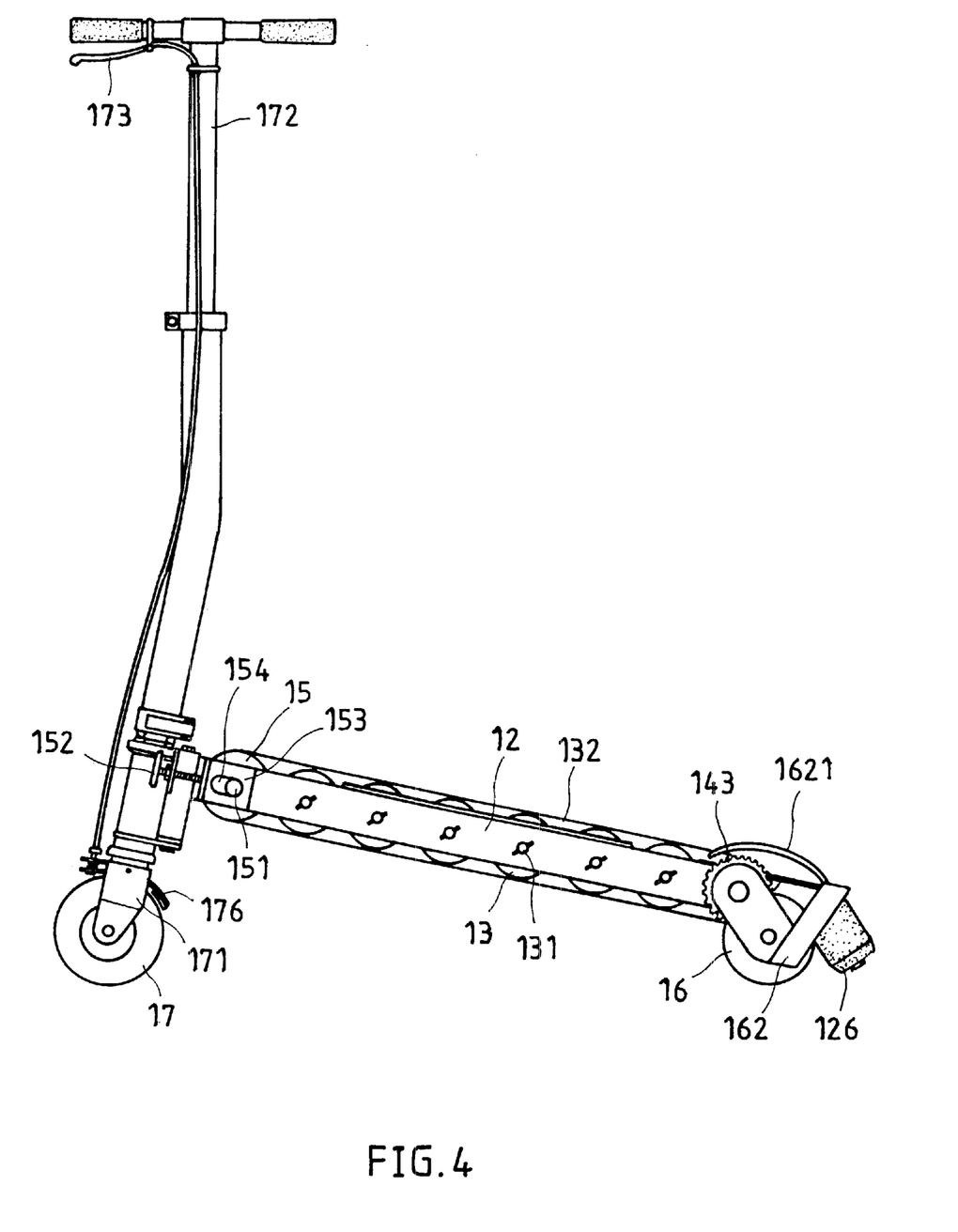
FIG. 4 is a side view of the jogging kick scooter according to the present invention.
Figure 5:
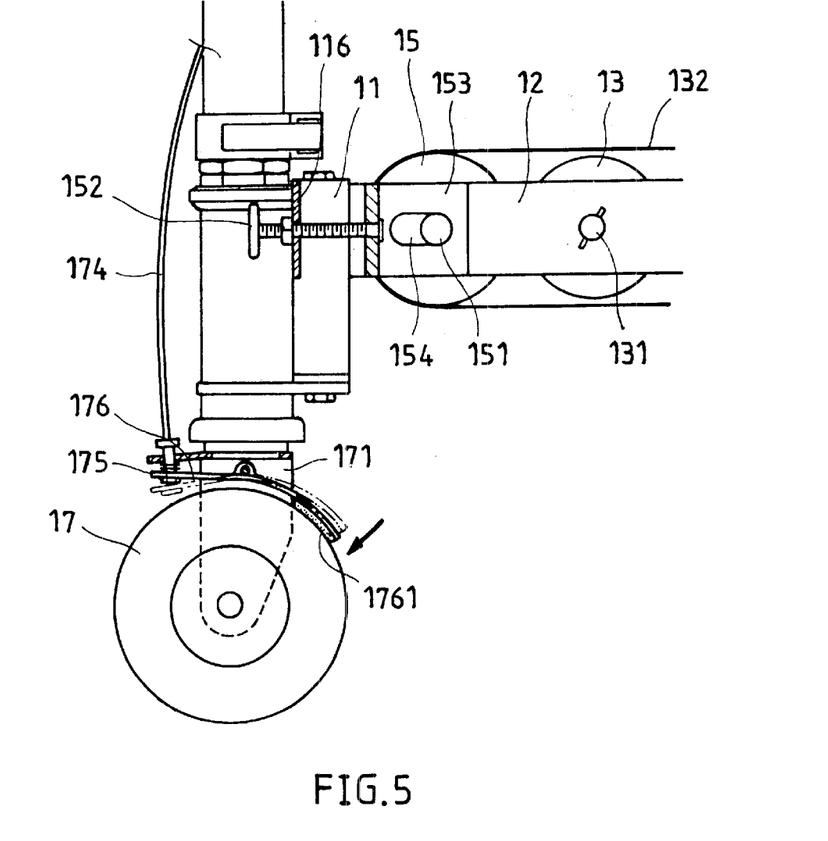
FIG. 5 is a side plain view in an enlarged scale of a part of the present invention, showing the operation of the front wheel brake structure of the jogging kick scooter.
Figure 6:
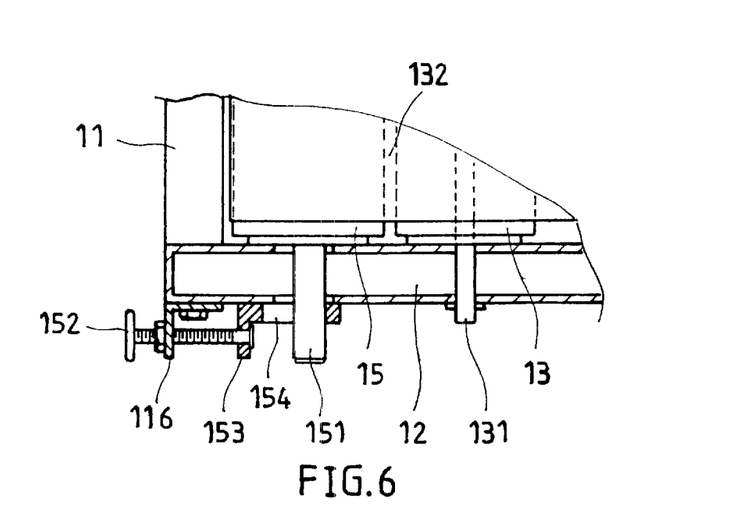
FIG. 6 is a sectional view in an enlarged scale of a part of the present invention, showing the arrangement of the adjustment screw and the slide in the side frame bar of the jogging kick scooter.

Referring to FIGS. from 1 through 6, a jogging kick scooter in accordance with the present invention is shown comprising a rectangular open base frame 1 formed of a transversely extended front frame bar 11, a pair of longitudinally extended side frame bars 12, and a transversely extended rear screw rod 19. A set of rolls 13;14;15 are coupled between the side frame bars 12 and arranged in parallel to the transverse extended front frame bar 11 and the transversely extended rear screw rod 19. The rolls 13;14;15 include a front roll 15, a rear roll 14, and a plurality of intermediate rolls 13 arranged in parallel between the front roll 15 and the rear roll 14. The rolls 13;14;15 have a respective wheel axle 131;141;151 coupled to the side frame bars 12 of the rectangular open base frame 1. An endless belt 132 is mounted on the rolls 13;14;15. The endless belt 132 can be made of rubber or sand cloth. Two inner brackets 124 are respectively fixedly fastened to the side frame bars 12 near the rear side. The inner brackets 124 each hold an axle bearing 125. Two outer brackets 162 are respectively fixedly fastened to the side frame bars 12 and spaced from the inner brackets 124 at an outer side. The outer brackets 162 each comprise a first axle bearing seat 163 in alignment with the axle bearing 125 of each of the inner brackets 124, a first axle bearing 164 set in the first axle bearing seat 163, a second axle bearing seat 165, and a second axle bearing 166 set in the second axle bearing seat 165. The axle 141 of the rear roll 14 has two ends respectively inserted through a respective opening 121 in each of the side frame bars 12 and supported in the axle bearing 125 of each of the inner brackets 124 and the first axle bearing 164 of each of the outer brackets 162. Two drive gears 143 are respectively mounted on the two ends of the axle 141 of the rear roll 14 between the inner brackets 124 and the outer brackets 162 and fixedly secured to the axle 141 of the rear roll 14 by a respective key 142. After installation of the axle 141, the rear roll 14 can be rotated with the axle 141 in the axle bearings 125;164. Two axle bearings 122 are respectively mounted in the side frame bars 12 in alignment with the second axle bearing 166 of each of the outer brackets 162. Two wheel axles 167 are respectively mounted in the axle bearings 122 in the side frame bars 12 and the second axle bearing 166 of each of the outer brackets 162. Two rear wheels 16 are respectively mounted on the wheel axles 167 for free rotation on the wheel axles 167. Two driven gears 161 are respectively fixedly fastened to the rear wheels 16 at an inner side around the wheel axles 167 and respectively meshed with the drive gears 143. When the user walks or runs on the endless belt 132, the axle 141 is rotated with the rear roll 14 to turn the drive gears 143, thereby causing the driven gears 161 to rotate the rear wheels 16, and therefore The jogging kick scooter is moved forwards or backwards. The outer brackets 162 each further comprise a fender 1621 adapted to protect the rear wheels 16 against splashing mud, collision, etc. A steering control handlebar 172 is installed in the transversely extended frame bar 11 of the rectangular open base frame 1 in vertical. A front fork 171 is connected to the bottom end of the steering control handlebar 172 to hold a front wheel 17. A brake arm 176 is pivoted to the front fork 171. The brake arm 176 has a brake shoe 1761 fixedly fastened to its one end and facing the periphery of the front wheel 17. A spring 175 is connected between the front fork 171 and the front end of the brake arm 176 to support to the brake arm 176 in the non-operative position where the brake shoe 1761 is spaced from the periphery of the front wheel 17 at a distance. A brake cable 174 is connected between the front end of the brake arm 176 and a brake lever 173 at the top side of the steering control handlebar 172. When pressing the brake lever 173 with the hand, the brake cable 174 is pulled to turn the brake arm 176 in one direction, causing the brake shoe 1761 to be forced against the periphery of the front wheel 17 to reduce the speed of rotation the front wheel 17 or to stop the front wheel 17 from rotation. The side frame bars 12 each have a front lug 116. Two adjustment screws 152 are respectively mounted in the front lug 116 of each of the side frame bars 12. Two slides 153 are respectively coupled between the side frame bars 12 and the adjustment screws 152. The slides 153 each have a through hole 154. The ends of the wheel axle 151 of the front roll 15 are respectively inserted through the through hole 154 of each of the slides 153. When rotating the adjustment screws 152 clockwise or counter-clockwise, the slides 153 are moved forwards or backwards relative to the side frame bars 12 to tighten or loosen the tension of the endless belt 132. Two footplates 127 are respectively fixedly fastened to the side frame bars 12 (see FIG. 1). When the jogging kick scooter is sliding, the user can rest the feet on the footplates 127. Further, the vertical distance between the front wheel 17 and the rectangular open base frame 1 is greater than the vertical distance between the rectangular open base frame 1 and the rear wheels 16 so that the rectangular open base frame 1 slopes downwardly backwards when the jogging kick scooter is put on a flat surface. This backward sloping design enables the user to conveniently walk or run on the endless belt 132 to move the jogging kick scooter. Further, The opening 121 of each of the side frame bars 12 slopes upwardly backwards toward the top side of the respective side frame bar 12. After installation of the wheel axle 141 in the opening 121 of each of the side frame bars 12, the tension of the endless belt 132 is stretched tight to pull the wheel axle 141 toward the lowest front end of each of the opening 121, and therefore the wheel axle 141 is prohibited from escaping out of the opening 121 of each of the side frame bars 12. Two friction blocks 126 are respectively fixedly fastened to the side frame bars 12 by a respective screw 1261. When the front wheel 17 is lifted with the front side of the jogging kick scooter from the ground to a certain height, the friction blocks 126 will be forced against the ground to stop the jogging kick scooter from moving on the ground.

Figure 7:
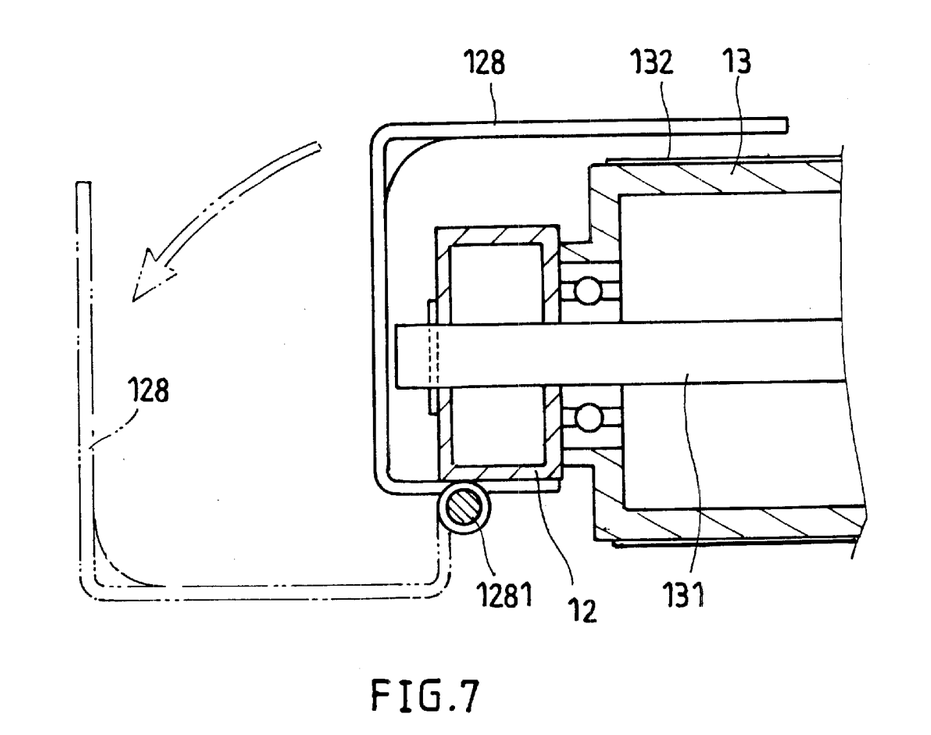
FIG. 7 is a schematic drawing showing a foldaway footplate hinged to the side frame bar according to the present invention.

Referring to FIG. 7, as an alternate form of the present invention, two foldaway footplates 128 are respectively hinged to the side frame bars 12 by a respective hinge 1281. The foldaway footplates 128 can be turned between the non-operative position (see the imaginary line) and the operative position (see the rear line).

Figure 8:
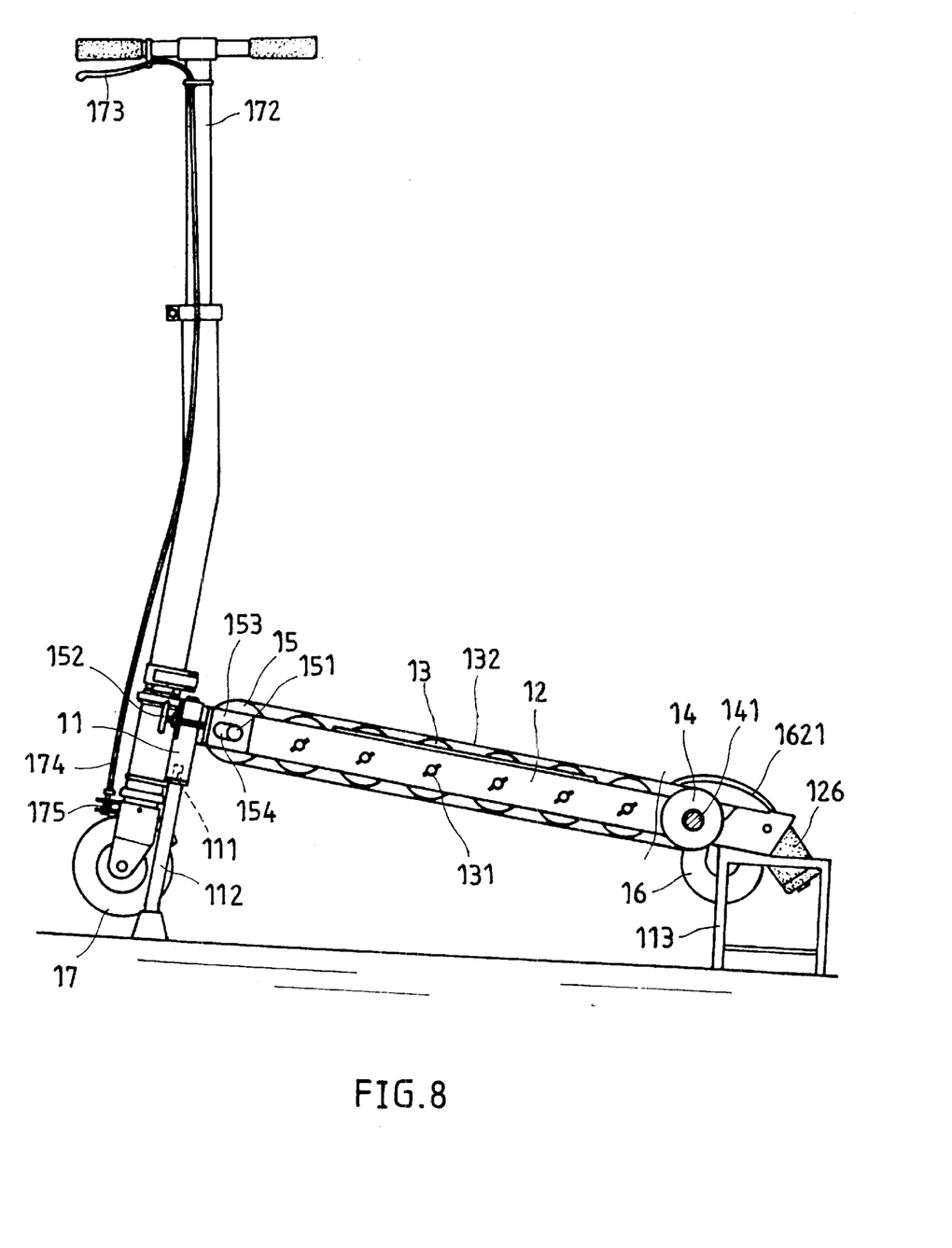
FIG. 8 shows the jogging kick scooter supported on a stand and a rack above the floor according to the present invention.

The kick scoter of the present invention can be used as a jogging exerciser. As illustrated in FIG. 8, a stand 112 and a rack 113 are used to support the jogging kick scooter on the floor, keeping the front wheel 17 and the rear wheels 16 suspended above the floor. The stand 112 is fastened to bottom plugholes 111 of the transversely extended front frame bar 11. The rack 113 supports the rear part of the rectangular open base frame 1 on the floor.

Figures 9, 10:
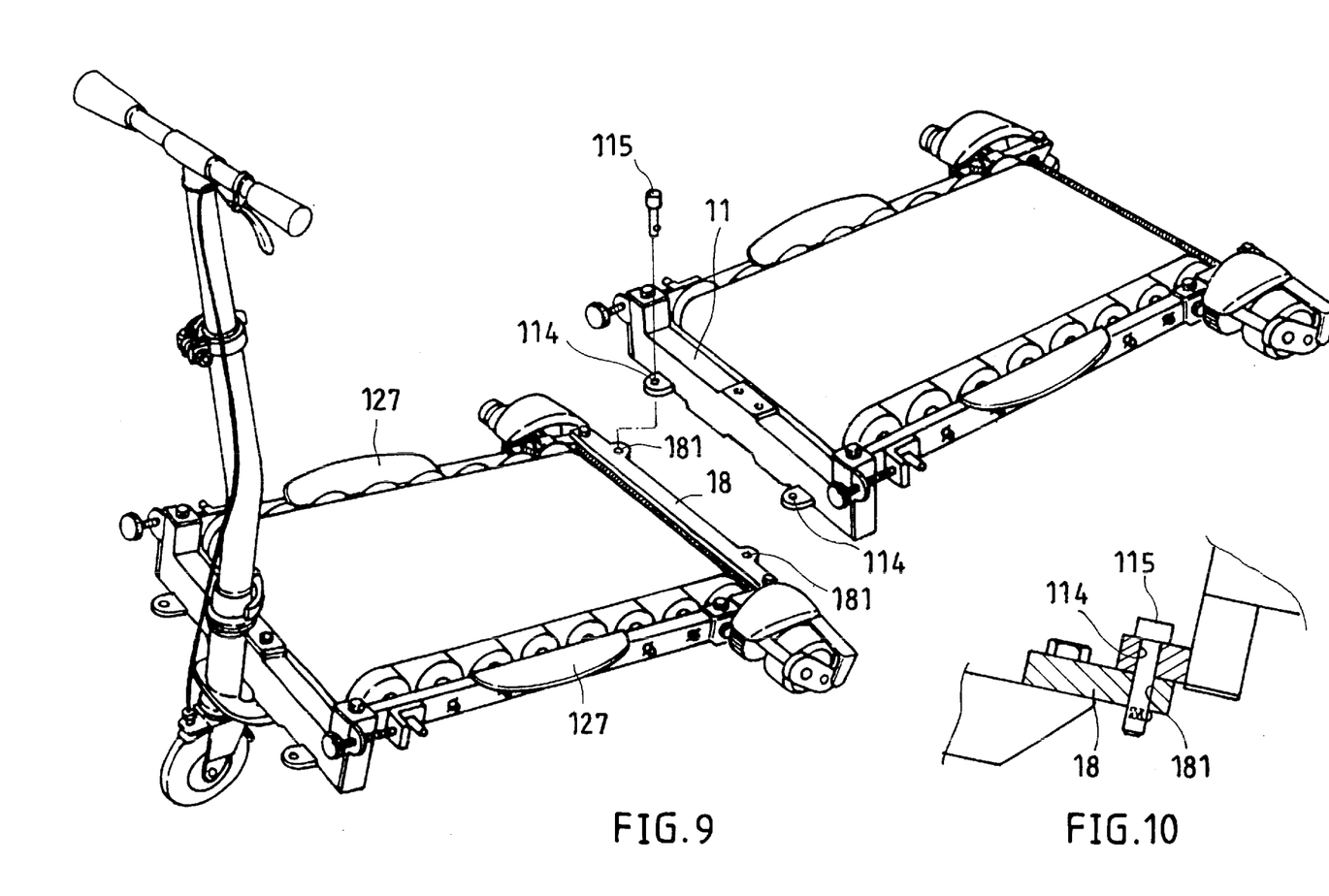
FIG. 9 is an exploded view of a tandem jogging kick scooter constructed according to the present invention.
FIG. 10 is a sectional assembly view of a part of the tandem jogging kick scooter according to the present invention, showing the connection between the rear eyelet lugs of the first jogging kick scooter and the eyelet lugs of the second jogging kick scooter

Referring to FIGS. 9 and 10, the rectangular open base frame 1 has a plurality of eyelet lugs 114 respectively forwardly extended from the transversely extended front frame bar 11, a transversely extended rear frame bar 18, and a plurality of eyelet lugs 181 respectively backwardly extended from the transversely extended rear frame bar 18.

A second kick scooter, after removal of its steering control handlebar 172 and front wheel 17, can be fastened to a first kick scooter to form with the first kick scooter a tandem kick scooter by means of fastening the front eyelet lugs 114 of the second kick scooter to the rear eyelet lugs 181 of the first kick scooter by respective lock pins 115.

It is to be understood that the drawings are designed for purposes of illustration only, and are not intended for use as a definition of the limits and scope of the invention disclosed.

What the invention claimed is:

1. A jogging kick scooter comprising:

a rectangular open base frame, said rectangular open base frame comprising a transversely extended front frame bar, a transversely extended rear screw rod, a pair of longitudinally extended side frame bars connected between said transversely extended front frame bar and said transversely extended rear screw rod, and two axle bearings respectively installed in said side frame bars;

a set of rolls coupled between said side frame bars and arranged in parallel to said transverse extended front frame bar and said transversely extended rear screw rod said rolls including a front roll, a rear roll, and a plurality of intermediate rolls arranged in parallel between said front roll and said rear roll said rolls having a respective wheel axle respectively coupled to said side frame bars of said rectangular open base frame;

an endless belt mounted on said rolls;

two inner brackets respectively fixedly fastened to said side frame bars, said inner brackets each holding an axle bearing, which supports the wheel axle of said rear roll;

two outer brackets respectively fixedly fastened to said side frame bars and spaced from said first inner brackets at an outer side, said outer brackets each comprising a first axle bearing seat in alignment with the axle bearing of each of said inner brackets, a first axle bearing set in said first axle bearing seat and supporting the wheel axle of said rear roll, a second axle bearing seat, and a second axle bearing set in said second axle bearing seat;

two drive gears respectively fixedly mounted on two ends of the wheel axle of said rear roll between said inner brackets and said outer brackets;

two rear wheel axles respectively mounted in the axle bearings in said side frame bars of said rectangular open base frame and the second axle bearing of each of said outer brackets;

two rear wheels respectively mounted on said rear wheel axles for free rotation on said rear wheel axles;

two driven gears respectively fixedly fastened to said rear wheels at an inner side around said rear wheel axles and respectively meshed with said drive gears;

a steering control handlebar installed in said transversely extended frame bar of said rectangular open base frame; and a front fork connected to a bottom end of said steering control handlebar and holding a front wheel.

2. The jogging kick scooter as claimed in claim 1 further comprising:

a brake arm pivoted to said front fork, said brake arm having a brake shoe fixedly disposed at a rear end thereof and facing the periphery of said front wheel and adapted to stop said front wheel upon turning of said brake arm in one direction relative to said front fork;

a spring connected between said front fork and a front end of said brake arm to support to said brake arm in the position where said brake shoe is spaced from the periphery of said front wheel;

a brake lever pivoted to said steering control handlebar at a top side; and a brake cable connected between said brake arm and said brake lever and adapted to turn said brake arm in one direction to further force said brake shoe against the periphery of said front wheel upon pressing of said brake lever by the user.

3. The jogging kick scooter as claimed in claim 1 further comprising two adjustment screws respectively mounted in a front lug of each of said side frame bars; and two slides respectively coupled between said side frame bars and said adjustment screws and adapted to adjust the tension of said endless belt upon rotation of said adjustment screws, said slides each having a through hole respectively coupled to two distal ends of the wheel axle of said front roll for enabling said front roll to be moved forwards/backwards with said slides relative to said intermediate rolls upon rotation of said adjustment screws by the user.

4. The jogging kick scooter as claimed in claim 1 wherein said side frame bars each have an opening sloping upwardly backwards toward a top side thereof, which receives the ends of the wheel axle of said rear roll.

5. The kick scooter as claimed in claim 1 further comprising a stand adapted to support a front part of said rectangular open base frame on the ground to suspend said front wheel from the ground, said stand having means for fastening to bottom plug holes in said transversely extended front frame bar, and a rack adapted to support a rear part of said rectangular open base frame on the ground to suspend said rear wheels from the ground.

6. The kick scooter as claimed in claim 1 wherein said rectangular open base frame comprises a plurality of front eyelet lugs forwardly extended from said transversely extended front frame bar, a transversely extended rear frame bar, and a plurality of rear eyelet lugs respectively backwardly extended from said transversely extended rear frame bar corresponding to the front eyelet lugs, said front eyelet lugs and said rear eyelet lugs being so arranged that two kick scooters can be connected into a tandem kick scooter by means of fastening the front eyelet lugs of a second kick scooter to the rear eyelet lugs of a first kick scooter by respective lock pins after removal of the steering control handlebar and front wheel of said second kick scooter.

7. The jogging kick scooter as claimed in claim 1 further comprising two footplates respectively fixedly fastened to said side frame bars.

8. The jogging kick scooter as claimed in claim 1 further comprising two foldaway footplates respectively hinged to said side frame bars by a respective hinge.

9. The jogging kick scooter as claimed in claim 1 further comprising two friction blocks respectively fixedly fastened to said side frame bars at a rear side by a respective screw and adapted to stop the jogging kick scooter against the ground when the front side of the jogging kick scooter is lifted from the ground.

10. The jogging kick scooter as claimed in claim 1 wherein said endless belt is made of sand cloth.

* * * * *